(12) United States Patent
Awano et al.

(10) Patent No.: US 8,137,844 B2
(45) Date of Patent: Mar. 20, 2012

(54) CATHODE ACTIVE MATERIAL FOR LITHIUM RECHARGEABLE BATTERY, MANUFACTURING METHOD THEREOF AND LITHIUM RECHARGEABLE BATTERY

(75) Inventors: Hidekazu Awano, Tokyo (JP); Minoru Fukuchi, Tokyo (JP); Yuuki Anbe, Tokyo (JP)

(73) Assignee: Nippon Chemical Industrial Co., Ltd., Tokyo (JP)

( * ) Notice: Subject to any disclaimer, the term of this patent is extended or adjusted under 35 U.S.C. 154(b) by 90 days.

(21) Appl. No.: 11/941,387

(22) Filed: Nov. 16, 2007

(65) Prior Publication Data

US 2008/0118428 A1 May 22, 2008

(30) Foreign Application Priority Data

Nov. 17, 2006 (JP) ................................. 2006-312121
Jun. 15, 2007 (JP) ................................. 2007-159450

(51) Int. Cl.
*C01B 13/18* (2006.01)
*C01D 15/02* (2006.01)
*C01F 5/00* (2006.01)
*C01F 7/00* (2006.01)
*C01G 9/02* (2006.01)
*C01G 15/00* (2006.01)
*C01G 45/02* (2006.01)
*C01G 49/02* (2006.01)
*C01G 51/04* (2006.01)
*C01G 53/04* (2006.01)
*H01M 4/131* (2010.01)

(52) U.S. Cl. .................... 429/231.95; 429/223; 429/209; 429/218.1; 429/224; 429/231.1; 429/231.9; 423/594.6; 423/111; 423/115; 423/155; 423/179; 423/179.5; 423/579; 423/592.1; 423/593.1; 423/594.1; 423/594.2; 423/594.3; 423/594.5; 423/599; 423/600; 423/594.14; 423/594.15; 423/594.16; 423/624; 423/625; 423/630; 423/635; 423/636; 423/637; 423/638; 423/594.4

(58) Field of Classification Search .................. 429/223, 429/209, 218.1, 224, 229, 231.1, 231.3, 231.9, 429/231.95; 423/115, 155, 179, 179.5, 579, 423/592.1, 593.1, 594.1–594.6, 599, 600, 423/594.14–594.16, 624, 625, 630–638, 423/111

See application file for complete search history.

(56) References Cited

U.S. PATENT DOCUMENTS

| | | | |
|---|---|---|---|
| 5,286,582 A | | 2/1994 | Tahara et al. |
| 2004/0091779 A1* | | 5/2004 | Kang et al. ................. 429/231.1 |
| 2006/0105240 A1* | | 5/2006 | Kinoshita et al. .......... 429/231.3 |

FOREIGN PATENT DOCUMENTS

| | | |
|---|---|---|
| JP | 5-54889 | 3/1993 |
| JP | 10-29820 | 2/1998 |
| JP | 10-81520 | 3/1998 |
| JP | 10-81521 | 3/1998 |
| JP | 2000-11993 | 1/2000 |
| JP | 2002-201028 | 7/2002 |
| JP | 2003-221235 | 8/2003 |
| JP | 2004-79386 | 3/2004 |
| JP | 2004-339032 | 12/2004 |
| JP | 2006-169048 | 6/2006 |

OTHER PUBLICATIONS

Mizushima et al., "$Li_xCoO_2$ ($0<x\leq1$): A New Cathode Material for Batteries of High Energy Density", Material Research Bulletin, vol. 15, pp. 783-790, 1980.
English language Abstract of JP 5-54889.
English language Abstract of JP 2000-11993.
English language Abstract of JP2004-79386.
English language Abstract of JP2003-221235.
English language Abstract of JP2004-339032.
English language Abstract of JP2006-169048.
English language Abstract of JP10-81521.
English language Abstract of JP10-81520.
English language Abstract of JP10-29820.
English language Abstract of JP2002-201028.

\* cited by examiner

*Primary Examiner* — Jerry Lorengo
*Assistant Examiner* — Jared Wood
(74) *Attorney, Agent, or Firm* — Greenblum & Bernstein, P.L.C.

(57) ABSTRACT

A method for manufacturing a cathode active material for a lithium rechargeable battery, including: selecting a first metal compound from a group consisting of a halide, a phosphate, a hydrogen phosphate and a sulfate of Mg or Al; selecting a second metal compound from a group consisting of an oxide, a hydroxide and a carbonate of Mg or Al; combining the first metal compound and the second metal compound to obtain a metal compound, the metal compound containing either Mg or Al atoms; mixing a lithium compound, a transition metal compound and the metal compound to obtain a mixture; and sintering the mixture.

12 Claims, 3 Drawing Sheets

Specimen containing first magnesium compound (MgF$_2$)

Specimen containing second magnesium compound (Mg(OH)$_2$)

CATHODE ACTIVE MATERIAL FOR LITHIUM RECHARGEABLE BATTERY, MANUFACTURING METHOD THEREOF AND LITHIUM RECHARGEABLE BATTERY

CROSS-REFERENCE TO RELATED APPLICATIONS

The present application claims priority under 35 U.S.C. §119 of Japanese Application Nos. 2006-312121, filed on Nov. 17, 2006, and 2007-159450, filed on Jun. 15, 2007, the disclosure of which is expressly incorporated by reference herein in its entirety.

BACKGROUND OF THE INVENTION

1. Field of the Invention

The present invention relates to a cathode active material for a lithium rechargeable battery, a manufacturing method thereof, and especially, a lithium rechargeable battery having a superior cyclic characteristic.

2. Description of Related Art

Along with the recent rapid progress in the field of domestic appliances toward portable and cordless, lithium ion rechargeable batteries have come into practical use as power sources for compact electronic devices such as laptop computers, portable telephones and video cameras. With regard to the lithium ion rechargeable batteries, Mizushima et al. reported in 1980 the usefulness of a lithium cobaltate as a cathode active material for a lithium ion rechargeable battery (Related Art 1), and since then, active research and development efforts have been made on lithium-based composite oxides, resulting in numerous proposals on the subject to date.

However, a lithium rechargeable battery that uses a lithium cobaltate has a cyclic characteristic degradation problem due to elution of cobalt atoms.

There are also proposals for using a lithium-cobalt based composite oxide as a cathode active material, the lithium-cobalt based composite oxide being obtained by partially substituting Co atoms of a lithium cobaltate with Mg atoms (for example, Related Arts 2-4).

In Related Arts 2-4, a magnesium oxide or a magnesium carbonate is used as an Mg source of raw materials for lithium-cobalt based composite oxides. Satisfactory cyclic characteristic is hard to achieve in a lithium rechargeable battery that uses a lithium-cobalt based composite oxide containing so-obtained magnesium atoms (hereafter, also noted as Mg atoms) as a cathode active material.

The inventors of the present invention previously proposed to use a lithium-cobalt based composite oxide as a cathode active material for a lithium rechargeable battery, the lithium-cobalt based composite oxide using a magnesium salt (such as a halide of $MgF_2$, a magnesium phosphate and a magnesium hydrogen phosphate) as an Mg source (for example, Related Arts 5-7).

[Related Art 1] Material Research Bulletin, vol. 15, pages 783-789, 1980

[Related Art 2] Japanese Patent Laid Open Publication No. HEI 5-54889, pages 1 and 8

[Related Art 3] Japanese Patent Laid Open Publication No. 2000-11993, pages 2 and 3

[Related Art 4] Japanese Patent Laid Open Publication No. 2004-79386, pages 2 and 7

[Related Art 5] Japanese Patent Laid Open Publication No. 2003-221235

[Related Art 6] Japanese Patent Laid Open Publication No. 2004-339032

[Related Art 7] Japanese Patent Laid Open Publication No. 2006-169048

The inventors of the present invention noticed in above-mentioned Related Arts 5-7 or during further studies that, when a metal compound, selected from a group consisting of a halide, a phosphate, a hydrogen phosphate and a sulfate of either Mg or Al, is used as a source of either Mg or Al, metal atoms preferentially exist as oxides of the metal on surfaces of particles of a sintered lithium transition metal composite oxide, due to an action of an anion component of the metal compound, and inhibit elution of cobalt ions that affect the cyclic characteristic. Therefore, a lithium rechargeable battery that uses the lithium transition metal composite oxide as a cathode active material shows a superior cyclic characteristic. Further improvement in performance of a lithium rechargeable battery is expected.

On the other side, when the lithium transition metal composite oxide is industrially produced, an anionic material reacts with a sintering container (such as a pot, an oven and a pod), which is made of alumina or silica and is used in a sintering process, and attaches to the interior of the sintering container, thereby reducing the productivity and making it difficult to obtain a product having stable quality.

SUMMARY OF THE INVENTION

The present invention is provided to resolve the above-described problems associated with the conventional technologies. A main purpose of the present invention is to provide a cathode active material for a lithium rechargeable battery and a manufacturing method thereof that provide in particular a superior cyclic characteristic for a lithium rechargeable battery when the cathode active material of the present invention is used as the cathode active material of the lithium rechargeable battery, and provides an industrial advantage in manufacturing the cathode active material.

Another main purpose of the present invention is to provide a lithium rechargeable battery using the cathode active material of the present invention, and having in particular superior cyclic characteristic and safety.

To resolve the above-described problems associated with the conventional technologies, the inventors of the present invention have conducted intensive studies, and found that, when a first metal compound selected from a group consisting of a halide, a phosphate, a hydrogen phosphate and a sulfate of Mg or Al, and a second metal compound selected from a group consisting of an oxide, a hydroxide and carbonate of Mg or Al, are combined as a metal compound that serves as a source for Mg or Al, a reaction between an anionic material and a sintering container can be inhibited, and attachment of the anionic material to a sintering container is prevented, thereby providing an industrial advantage in manufacturing a lithium transition metal composite oxide containing either Mg or Al atoms.

The inventors of the present invention further found that, when the first metal compound selected from the group consisting of a halide, a phosphate, a hydrogen phosphate and a sulfate of Mg or Al, and the second metal compound selected from the group consisting of an oxide, a hydroxide and a carbonate of Mg or Al, are combined, oxides of magnesium or aluminum that originate from the first metal compound preferentially exist on surfaces of particles of a sintered lithium transition metal composite oxide; and magnesium or aluminum that originates from the second metal compound preferentially uniformly exists inside the particles. Actions of magnesium or aluminum that exists on surfaces of and inside the particles stabilize crystal structures and further inhibit elution of cobalt ions that affect the cyclic characteristic, thereby making it possible to provide a lithium rechargeable battery having a superior cyclic characteristic, the lithium rechargeable battery using a lithium transition metal composite oxide containing either Mg or Al as a cathode active material. The present invention has been accomplished based on these findings.

Specifically, an aspect of the present invention is a cathode active material for a lithium rechargeable battery including a lithium transition metal composite oxide that contains either Mg or Al atoms. The lithium transition metal composite oxide is obtained by sintering a mixture of a lithium compound, a transition metal compound and a metal compound. The metal compound contains either Mg or Al atoms, and is obtained by combining a first metal compound and a second metal compound, the first metal compound being selected from a group consisting of a halide, a phosphate, a hydrogen phosphate and a sulfate of either Mg or Al, and the second metal compound being selected from a group consisting of an oxide, a hydroxide and a carbonate of either Mg or Al.

Another aspect of the present invention is a method for manufacturing a cathode active material for a lithium rechargeable battery. The method including: selecting a first metal compound from a group consisting of a halide, a phosphate, a hydrogen phosphate and a sulfate of either Mg or Al; selecting a second metal compound from a group consisting of an oxide, a hydroxide and a carbonate of either Mg or Al; combining the first metal compound and the second metal compound to obtain a metal compound containing either Mg or Al atoms; mixing a lithium compound, a transition metal compound and the metal compound to obtain a mixture; and sintering the mixture.

Yet another aspect of the present invention is a lithium rechargeable battery using the cathode active material for a lithium rechargeable battery according to the present invention.

The cathode active material for a lithium rechargeable battery of the present invention does not cause a reaction of an anionic material and a sintering container, and prevents attachment of the cathode active material to the sintering container, thereby providing an industrial advantage in manufacturing.

A lithium rechargeable battery using the cathode active material for a lithium rechargeable battery of the present invention has in particular a superior cyclic characteristic. Further, since metal oxides exist on surfaces of particles of the cathode active material for a lithium rechargeable battery of the present invention, oxygen release during charging is inhibited, and an improvement in the safety of the lithium rechargeable battery is expected.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
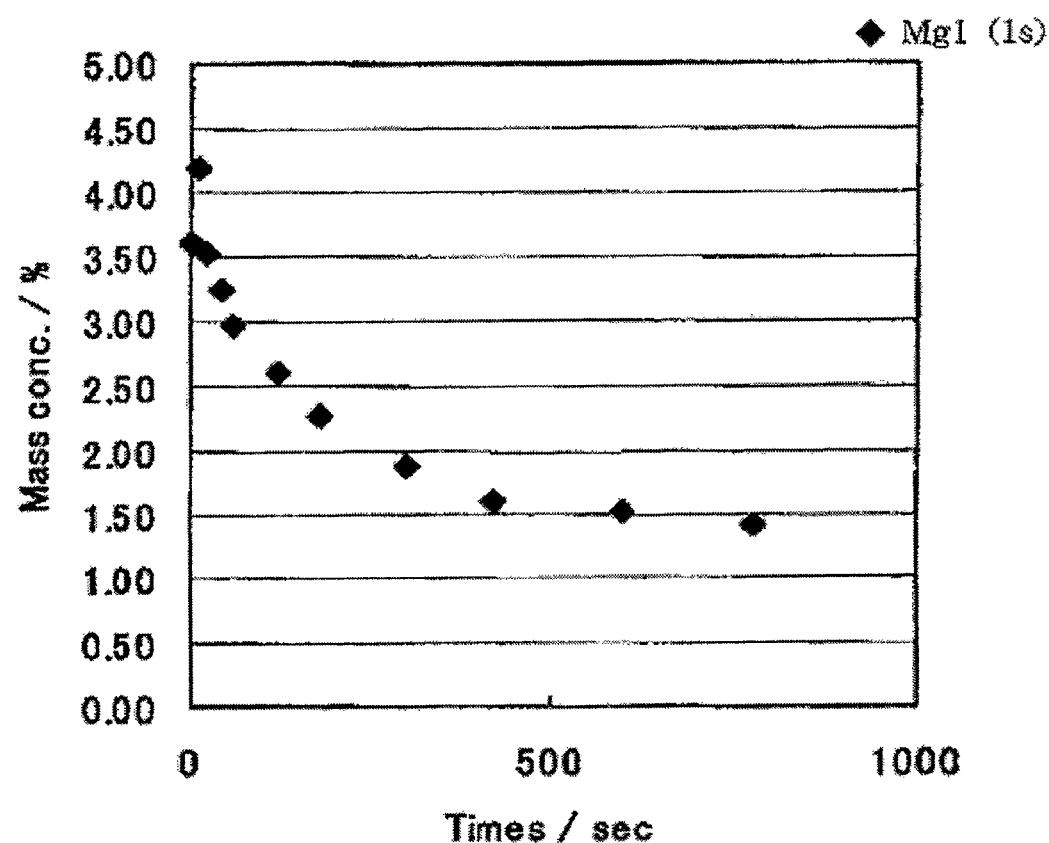
FIG. 1A illustrates magnesium quantity along a depth-wise direction of a lithium transition metal composite oxide containing a first magnesium compound ($MgF_2$) according to a first synthesis example.
FIG. 1B illustrates magnesium quantity along a depth-wise direction of a lithium transition metal composite oxide containing a second magnesium compound ($Mg(OH)_2$) according to a second synthesis example.
Figure 1:
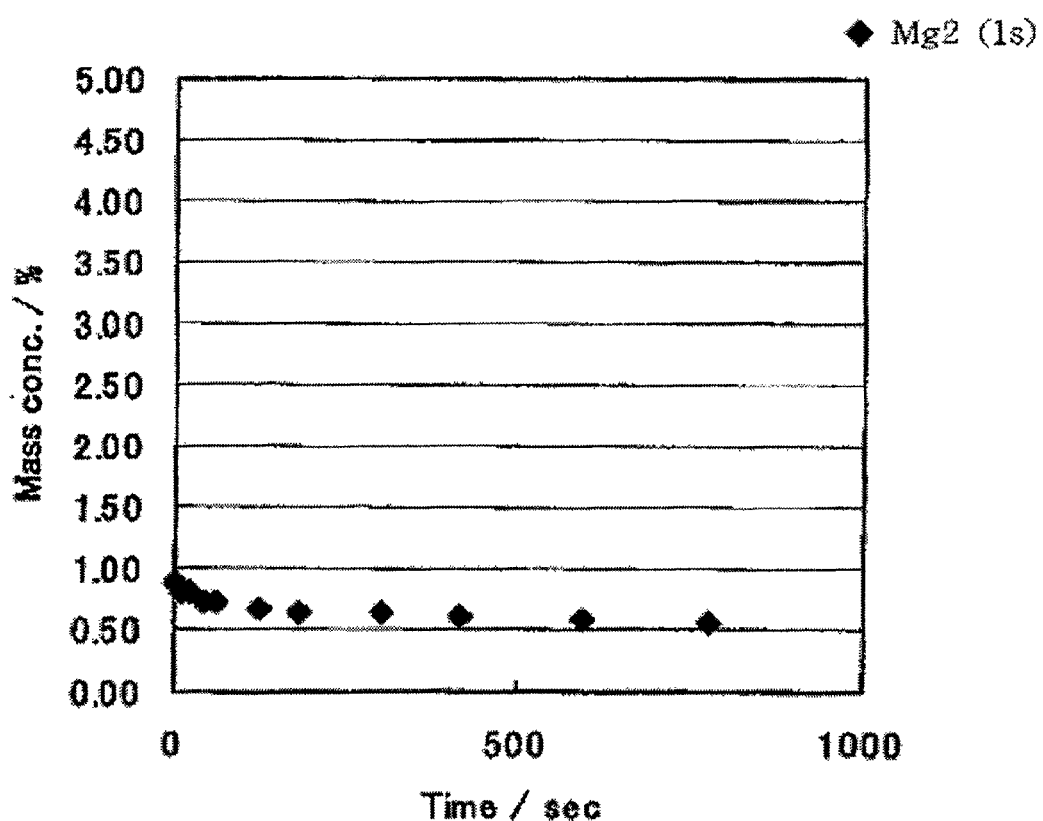

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

The present invention is explained in the following based on the embodiments.

The cathode active material for a lithium rechargeable battery of the present invention is a lithium transition metal composite oxide that contains Mg or Al atoms. The lithium transition metal composite oxide is obtained by sintering a mixture of a lithium compound, a transition metal compound and a metal compound. The metal compound contains Mg or Al atoms, and is obtained by combining a first metal compound and a second metal compound, the first metal compound being selected from a group consisting of a halide, a phosphate, a hydrogen phosphate and a sulfate of Mg or Al, and the second metal compound being selected from a group consisting of an oxide, a hydroxide and a carbonate of Mg or Al. A cathode active material for a lithium rechargeable battery having such a composition allows a lithium rechargeable battery using the cathode active material to have a superior cyclic characteristic. Further, with regard to manufacturing the cathode active material, since a reaction between an anionic material and a sintering container is inhibited, there is an industrial advantage in manufacturing the cathode active material for a lithium rechargeable battery.

In the present invention, examples of the lithium transition metal composite oxide that contains either Mg or Al include (1) $Li_xCO_{1-y}Me_yO_2$ (Me being a transition metal element other than Co, x being a number in a range of $0.90 \leq x \leq 1.2$, and y being a number in a range of $0 \leq y \leq 0.05$), (2) $LiNi_{1-x-y}CoMn_yO_2$ ($0 \leq x \leq 1.0$ and $0 \leq y \leq 1.0$), (3) $LiFePO_4$, (4) $LiNi_{0.5}Mn_{1.5}O_4$ and (5) $LiMn_2O_4$. Among these examples, $Li_xCo_{1-y}Me_yO_2$ allows oxides of a metal that originates from the first metal compound to preferentially exist on surfaces of particles, and has a high synergy with either Mg or Al atoms contained therein. A lithium rechargeable battery that uses, as a cathode active material, the lithium transition metal composite oxide containing either Mg or Al has in particular a superior cyclic characteristic, and is therefore favorable. Examples of above-noted Me include Ti, Zr, Ga and Zn, and Ti is particularly favorable. It is particularly favorable that the range of above-noted y be from 0.001 to 0.03, or optimally from 0.003 to 0.02, since safety and cyclic characteristic can be further improved.

In a lithium transition metal composite oxide containing either Mg or Al, the content of Mg or Al atoms as metal atoms is desirably from 0.01 to 1.0 weight %, or optimally from 0.1 to 0.5 weight %. The reason for this is that, when the content of Mg or Al atoms as metal atoms is below 0.01 weight %, there is a tendency that a good cyclic characteristic is not obtainable for a lithium rechargeable battery using the lithium transition metal composite oxide as a cathode active material, and, on other hand, when the content is above 1.0 weight %, there is a tendency that a sufficient service capacity is not obtainable.

One of major features of the present invention is combining a first metal compound and a second metal compound as a source of either Mg or Al.

The first metal compound is selected from a group consisting of a halide, a phosphate, a hydrogen phosphate and a sulfate of a metal. The hydrogen phosphate can be a monohydrogen phosphate or a dihydrogen phosphate. These first metal compounds can be an aqueous material or an anhydride. Among these compounds, using a halide of a metal as the first metal compound is particularly favorable in that, when the lithium transition metal composite oxide uses a halide of a metal, a lithium rechargeable battery using the lithium transition metal composite oxide as a cathode active material has a superior cyclic characteristic.

On the other hand, the second metal compound is selected from a group consisting of an oxide, a hydroxide and a carbonate of a metal. Among these compounds, the oxide is particularly favorable in that it eases attachment to a sintering container.

An additive amount ($MC_2/MC_1$) of the second metal compound ($MC_2$) with respect to the first metal compound ($MC_1$) as metal atoms is desirably from 20 to 500 weight %, or optimally from 50 to 200 weight %. The reason for this is that, when the additive amount of the second metal compound with respect to the first metal compound is below 20 weight %, there is a tendency that it increases attachment to a sintering container, and, on the other hand, when the additive amount is above 500 weight %, there is a tendency that a satisfactory cyclic characteristic is not obtainable for a lithium rechargeable battery using the lithium transition metal composite oxide as a cathode active material.

The lithium transition metal composite oxide of the present invention contains Mg or Al atoms in form of metal oxides and Mg or Al atoms. The metal oxides are formed by sintering the first metal compound, and mainly exist on or near surfaces of particles. The Mg or Al atoms are produced by sintering the second metal compound, and mainly exist inside the particles, forming a solid solution with the lithium transition metal composite oxide.

It is desirable that the content of free anions liquated out in water is less than or equal to 5000 ppm, or optimally less than or equal to 2000 ppm, the free anions originating from the first metal compound and being either halogen ions, phosphate ions, hydrogen phosphate ions or sulfate ions. The reason for this is that, when the content of the free anions is above 5000 ppm, there is a tendency that it causes problems such as a viscosity increase when synthesizing a cathode plate.

By using the combination of the first metal compound and the second metal compound, the first metal compound mainly preferentially exists as metal oxides on surfaces of particles of the lithium transition metal composite oxide, and the second metal compound mainly preferentially exists inside the particles, forming a solid solution with the lithium transition metal composite oxide. A percentage of the Mg or Al atoms that exist on surfaces of and inside the particles is not clear. However, the lithium transition metal composite oxide of the present invention, which is obtained by adding the first metal compound and the second metal compound according to an additive amount and an additive percentage within the above-noted ranges and by sintering, has a stable crystal structure, and is able to sufficiently inhibit elution of cobalt ions that affect the cyclic characteristic, thereby making it possible to provide a cathode active material having a superior cyclic characteristic.

In addition to the above-described solid state properties, the lithium transition metal composite oxide of the present invention, which contains Mg or Al atoms and is used as a cathode active material for a lithium rechargeable battery, also has an average particle size of from 0.5 to 30 μm, or optimally from 10 to 25 μm, the average particle size being obtained by using a laser particle size distribution measurement method. An average particle size in this range allows formation of a coating film having a uniform thickness. It is particularly desirable that the range is from 10 to 20 μm, which allows further improvement in thermal safety of a lithium rechargeable battery that uses, as a cathode active material, the lithium transition metal composite oxide containing Mg or Al atoms. In the following, "average particle size" means a value obtained by using a laser particle size distribution measurement method.

The lithium transition metal composite oxide of the present invention, which contains Mg or Al atoms and is used as a cathode active material for a lithium rechargeable battery, has a BET ratio surface area of from 0.05 to 1 $m^2/g$, or optimally from 0.15 to 0.6 $m^2/g$. A BET ratio surface area in this range results in good safety, and is therefore desirable.

The cathode active material for a lithium rechargeable battery of the present invention having the above-described solid state properties can be manufactured by sintering a mixture of a lithium compound, a transition metal compound and a metal compound. The metal compound contains Mg or Al atoms, and is obtained by combining a first metal compound and a second metal compound, the first metal compound being selected from a group consisting of a halide, a phosphate, a hydrogen phosphate and a sulfate of a metal, and the second metal compound being selected from a group consisting of an oxide, a hydroxide and a carbonate of the metal.

Examples of the lithium compound as a row material include an oxide, a hydroxide, a carbonate, a nitrate and an organic acid salt of lithium. Among these compounds, the industrially inexpensive lithium carbonate is favorable. The lithium compound has a good reactivity when its average particle size is from 0.1 to 200 μm, or optimally from 2 to 50 μm, and is therefore particularly favorable.

Examples of the transition metal compound as a row material include an oxide, an oxyhydroxide, a hydroxide, a carbonate, a nitrate and an organic acid salt, containing a transition metal element selected from cobalt, nickel, manganese, iron and titanium. The transition metal compound can also be a complex compound containing two or more of the above-mentioned transition metal elements. As the composite compound, a composite hydroxide, a composite oxyhydroxide, a composite carbonate or a composite oxide are favorably used. The composite hydroxide can be prepared, for example, by using a coprecipitation method. Specifically, a composite oxide can coprecipitated by mixing an aqueous solution containing two or more of the above-mentioned transition metal elements, an aqueous solution of a complexing agent and an alkaline aqueous solution (see for example, Japanese Patent Laid Open Publication No. HEI 10-81521; Japanese Patent Laid Open Publication No. HEI 10-81520; Japanese Patent Laid Open Publication No. HEI 10-29820; and Japanese Patent Laid Open Publication No. 2002-201028). In a case where a composite oxyhydroxide is used, after a precipitate of a composite hydroxide is obtained according to the above-described coprecipitation process, all one needs to do is to blow air to a reaction solution to perform oxidation of a composite oxide. In a case where a composite oxide is used, after a precipitate of a composite hydroxide is obtained according to the coprecipitation process, a composite oxide can be obtained by a heating treatment of the precipitate at, for example, from 200 to 500° C. In a case where a composite carbonate is used, a composite carbonate can be obtained in a similar way as the above-described coprecipitation method by preparing an aqueous solution containing two or more of the above-mentioned transition metal elements and an aqueous solution of a complexing agent; using the alkaline aqueous solution as an aqueous solution of an alkaline carbonate or alkaline hydrogen carbonate; and mixing them together. The transition metal compound has a good reactivity when its average particle size is from 0.5 to 30.0 µm, or optimally from 10.0 to 25.0 µm, and is therefore particularly favorable.

Types of the first metal compound, as described above, include a halide, a phosphate, a hydrogen phosphate and a sulfate of a metal. The hydrogen phosphate can be a monohydrogen phosphate or a dihydrogen phosphate. The first metal compound has a good reactivity when its average particle size is from 1.0 to 30.0 µm, or optimally from 1.0 to 20.0 µm, and is therefore particularly favorable.

Types of the second metal compound, as described above, include an oxide, a hydroxide and a carbonate of a metal. The second metal compound has a good reactivity when its average particle size is from 1.0 to 30.0 µm, or optimally from 1.0 to 20.0 µm, and is therefore particularly favorable.

In order to produce a high purity lithium transition metal composite oxide, it is desirable that the raw material lithium compound, transition metal compound and first and second metal compounds, however they are prepared, contain as less impurities as possible.

In a reaction operation, first, predetermined amounts of the raw material lithium compound, transition metal compound and first and second metal compounds are mixed. The mixing can be either a dry type or a wet type. However, a dry type is favorable in view of easy manufacturing. In a case of a dry type mixing, it is desirable to use such a blender or the like that allows a uniform mixing of the raw materials.

Composition percentages of the raw material lithium compound, transition metal compound and first and second metal compounds are such that a mole ratio (Li/M) of Li atoms of the lithium compound with respect to transition metal atoms (M) of the transition metal compound is from 0.90 to 1.20, or optimally from 0.98 to 1.10. In the present invention, a stable service capacity is obtained when the composition amount of the Li atoms is in this range. On the other hand, a mole ratio of Li atoms of less than 0.90 tends to result in a significantly reduced service capacity, and a mole ratio of Li atoms of above 1.20 tends to result in a poor cyclic characteristic, and is therefore undesirable.

It is desirable that composition percentage of the raw material first and second metal compounds as Mg or Al atoms in the whole cathode active material is from 0.010 to 1.00 weight %, or optimally from 0.10 to 0.50 weight %. By having composition amount of the first and second metal compounds in this range, a lithium rechargeable battery using the so-obtained Mg or Al-containing lithium transition metal composite oxide as a cathode active material shows in particular superior cyclic characteristic and safety.

Further, composition percentage of the second metal compound with respect to the first metal compound as metal atoms is from 20 to 500 weight %, or optimally from 50 to 200 weight %. The reason for this is that, as described above, when the composition amount of the second metal compound as metal atoms is below 20 weight %, there is a tendency that attachment to a sintering container is increased, and, on the other hand, when the composition amount is above 500 weight %, there is a tendency that a satisfactory cyclic characteristic is not obtainable.

Next step is to sinter a mixture obtained by uniformly mixing the raw materials. In the present invention, in a case where water is generated during sintering, it is desirable to perform a multi-step sintering. It is desirable to slowly sinter at about from 200 to 400° C., at which water contained in the raw materials vaporizes, and then rapidly increase the temperature to about from 700 to 900° C. and further sinter for from 1 to 30 hours. In a case where another transition metal compound is used, it is desirable to sinter for from 1 to 30 hours in an air atmosphere or an oxygen atmosphere at from 800 to 1150° C., or optimally from 900 to 1100° C.

The sintering process can be repeated any times as needed. The container used in the sintering process can be made of alumina, silica, magnesium oxide, dalmite, mullite or cordierite. Among these container materials, the present invention has a feature of being able to prevent attachment of a sintered product to aluminum in particular.

After sintering, the sintered product is appropriately cooled, ground and classified as needed, and a lithium transition metal composite oxide containing Mg or Al atoms is obtained, which becomes the cathode active material for a lithium rechargeable battery of the present invention.

The grinding process that is performed as needed is appropriately performed in the case of a loosely bonded bulk sintered lithium transition metal composite oxide containing Mg or Al atoms. The particles themselves of the lithium transition metal composite oxide containing Mg or Al atoms have a specific average particle size and a BET ratio surface area. Namely, the obtained lithium transition metal composite oxide containing Mg or Al atoms has an average particle size of from 0.5 to 30.0 µm, or optimally from 10 to 25 µm, and a BET ratio surface area of from 0.05 to 1.0 $m^2/g$, or optimally from 0.15 to 0.60 $m^2/g$.

In addition to the above-described powder properties, the so-obtained lithium transition metal composite oxide containing Mg or Al atoms, according a preferred embodiment of the present invention, has a content of Mg or Al atoms of from 0.01 to 1.0 weight %, or optimally from 0.1 to 0.5 weight %, and a content of free anions less than or equal to 5000 ppm, or optimally less than or equal to 2000 ppm, the free anions mainly originating from the first metal compound and being either halogen ions, phosphate ions, hydrogen phosphate ions or sulfate ions.

The lithium rechargeable battery of the present invention uses the above-described cathode active material for a lithium rechargeable battery, and includes a cathode, an anode, a separator and a non-aqueous electrolyte containing a lithium salt. The cathode, for example, is formed by painting a cathode mix on a cathode current collector, and then drying it. The cathode mix includes a cathode active material, a conductive substance, an adhesive agent and a filler, which is added as needed. The lithium transition metal composite oxide containing Mg or Al atoms, which is the cathode active material, is uniformly painted on the cathode of the lithium rechargeable battery according to the present invention. For this reason, load characteristic degradation and cyclic characteristic degradation are hard to occur in the lithium rechargeable battery according to the present invention.

It is desirable that the content of the cathode active material in the cathode mix is from 70 to 100 weight %, or optimally from 90 to 98 weight %.

With regard to the cathode current collector, there is no specific restriction as far as it is an electronic conductor that does not cause a chemical change to the battery that includes the cathode current collector. Examples of the cathode current collector include a stainless steel, a nickel, an aluminum, a titanium, a sintered carbon, and a stainless steel and an aluminum having their surfaces processed with carbon, nickel, titanium or silver. These materials can also be used by having their surfaces oxidized; they can also be used by creating convexo-concave on a surface of the current collector. Examples of the form of the current collector include a foil, a film, a sheet, a net, a punched object, a lath structure, a porous body, a foam, fibers and an unwoven compact. Although there is no specific restriction with regard to the thickness of the current collector, it is desirable that it is in the range from 1 to 500 μm.

With regard to the conductive substance, there is no specific restriction as far as it is an electronic conductor that does not cause a chemical change to the battery that includes the conductive substance. Examples of the conductive substance include a graphite (such as a natural graphite or an artificial graphite), a carbon black (such as a carbon black, an acetylene black, a Ketjen black, a channel black, a furnace black, a lamp black and a thermal black), a conductive fiber (such as a carbon fiber and a metallic fiber), a metal powder (such as a carbon fluoride powder, an aluminum powder, and a nickel powder), a conductive whisker (such as a zinc oxide and a potassium titanate), a conductive metal oxide (such as a titanium oxide), and a conductive material (such as a polyphenylene dielectric). Examples of the natural graphite include a lepidic graphite, a scale-like graphite and an amorphous graphite. These materials can be used alone or in combination of two or more. Composition ratio of the conductive substance in the cathode mix is from 1 to 50 weight %, or optimally from 2 to 30 weight %.

Examples of the adhesive agent include a starch, a polyvinylidene fluoride, a polyvinyl alcohol, a carboxymethyl cellulose, a hydroxypropyl cellulose, a regenerated cellulose, a diacetyl cellulose, a polyvinylpyrrolidone, a tetrafluoroethylene, a polyethylene, a polypropylene, ethylene-propylene-diene terpolymer (EPDM), a sulfonated EPDM, a styrene-butadiene rubber, a fluorine-containing rubber, a tetrafluoroethylene-hexafluoroethylene copolymer, a tetrafluoroethylene-hexafluoropropylene copolymer, a tetrafluoroethylene-perfluoroalkylvinylether copolymer, a vinylidene fluoride-hexafluoropropylene copolymer, a vinylidene fluoride-chlorotrifluoroethylene copolymer, a ethylene-tetrafluoroethylene copolymer, a polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoroethylene copolymer, an ethylene-acrylic acid copolymer or its ($Na^+$) ion cross-liking agent, an ethylene-methacryl acid copolymer or its ($Na^+$) ion cross-liking agent, an ethylene-methyl acrylate copolymer or its ($Na^+$) ion cross-liking agent, an ethylene-methyl methacrylate copolymer or its ($Na^+$) ion cross-liking agent, a polysaccharide such as a polyethylene oxide, a thermoplastic resin, and a rubber-elastic polymer. These materials can be used alone or in combination of two or more. When using a compound containing a functional group such as a polysaccharide that reacts with lithium, it is desirable to deactivate its functional group when adding a compound such as an isocyanate group, for example. Composition ratio of the adhesive agent in the cathode mix is from 1 to 50 weight %, or optimally from 5 to 15 weight %.

The filler in the cathode mix is to inhibit volume expansion of the cathode, and is added as needed. Any fibrous material that does not cause chemical change in a battery containing the material can be used as the filler. For example, fibers of an olefin-based polymer such as a polypropylene and a polyethylene, a glass and carbon are used. Although there is no specific restriction with respect to the additive amount of the filler in the cathode mix, it is desirable that it is from 0 to 30 weight %.

The anode is formed by painting an anode material on a anode current collector, and then drying it. With regard to the anode current collector, there is no specific restriction as far as it is an electronic conductor that does not cause a chemical change to the battery that includes the anode current collector. Examples of the anode current collector include a stainless steel, a nickel, a copper, a titanium, an aluminum, a sintered carbon, a copper and a stainless steel having their surfaces processed with carbon, nickel, titanium and silver, or an aluminum-cadmium alloy. These materials can also be used by having their surfaces oxidized; they can also be used by creating convexo-concave on a surface of the current collector. Examples of the form of the current collector include a foil, a film, a sheet, a net, a punched object, a lath structure, a porous body, a foam, fibers and an unwoven compact. Although there is no specific restriction with regard to the thickness of the current collector, it is desirable that it is in the range from 1 to 500 μm.

With regard to the anode material, there is no specific restriction. Examples of the anode material include a carbonaceous material, a metal composite oxide, a lithium metal, a lithium alloy, a silicon based alloy, a tin based alloy, a metal oxide, a conductive polymer, a chalcogen compound, and a Li—Co—Ni based material. Examples of the carbonaceous material include non-graphitized carbon material and graphitized carbon material. Examples of the metal composite oxide include compounds such as $Sn_p(M^1)_{1-p}(M^2)_q O_r$ ($M^1$ being one or more elements selected from Mn, Fe, Pb and Ge; $M^2$ being one or more elements selected from Al, B, P, Si, elements from Group 1, Group 2 and Group 3 of the Periodic Table, and halogen elements; $0<p\leq1$; $1\leq q\leq 3$; and $1\leq r\leq 8$), $Li_xFe_2O_3$ ($0\leq x\leq 1$), $Li_xWO_2$ ($0\leq x\leq 1$). Examples of the metal oxide include GeO, $GeO_2$, SnO, $SnO_2$, PbO, $PbO_2$, $Pb_2O_3$, $Pb_3O_4$, $Sb_2O_3$, $Sb_2O_4$, $Sb_2O_5$, $Bi_2O_3$, $Bi_2O_4$ and $Bi_2O_5$. Examples of the conductive polymer include a polyacetylene and a poly-p-phenylene.

As the separator, an insulating thin film having a large ion permeability and a predetermined mechanical strength is used, such as a sheet or an unwoven fabric made of an olefin based polymer (such as a polypropylene, for its organic solvent resistance and hydrophobicity), glass fibers or a polyethylene. Pore sizes of the separator are kept in a range generally useful for a battery, for example, in the range from 0.01 to 10 μm. The thickness of the separator is kept in a range generally useful for a battery, for example, in the range from 5 to 300 μm. In a case where a solid state electrolyte such as a polymer is used as an electrolyte (which will be described later), it is also possible to have the solid state electrolyte double as a separator.

The non-aqueous electrolyte containing a lithium salt is formed from a non-aqueous electrolyte and a lithium salt. As the non-aqueous electrolyte, a non-aqueous electrolytic solution, an organic solid state electrolyte and an inorganic solid state electrolyte are used. Examples of the non-aqueous electrolytic solution include a solvent containing one or more non-protonic organic solvents such as N-methyl-2-pyrrolidinone, a propylene carbonate, an ethylene carbonate, a butylene carbonate, a dimethyl carbonate, a diethyl carbonate, a γ-butyrolactone, a 1,2-dimethoxyethane, a tetrahydroxyfuran, a 2-methyltetrahydrofuran, a dimethylsulfoxide, a 1,3-dioxolan, a formamide, a dimethylformamide, a dioxolan, an acetonitrile, a nitromethane, a methyl formate, a methyl acetate, a phosphate triester, a trimethoxymethane, a dioxolan derivative, a sulfolane, a methylsulfolane, a 3-methyl-2-oxazolidinone, a 1,3-dimethyl-2-imidazolidinone, a propylene carbonate derivative, a tetrahydroxyfuran derivative, a diethyl ether, a 1,3-propane sultone, a methyl propionate and an ethyl propionate.

Examples of the organic solid state electrolyte include: a polyethylene derivative; a polyethylene oxide derivative or a polymer containing a polyethylene oxide derivative; a polypropylene oxide derivative or a polymer containing a polypropylene oxide derivative; an ester phosphate polymer; a polymer containing an ionic dissociable group such as a polyphosphazene, a polyaziridine, a polyethylene sulfate, a polyvinyl alcohol, a polyvinylidene fluoride and a polyhexafluoropropylene; and a mixture of a polymer containing the ionic dissociable group and the above-described non-aqueous electrolyte solution.

As the inorganic solid state electrolyte, a nitride, a halide, an oxyacid salt and a sulfide of Li can be used, and examples of such materials include $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $P_2S_5$, $Li_2S$ or $Li_2S$—$P_2S_5$, $Li_2S$—$SiS_2$, $Li_2S$—$GeS_2$, $Li_2S$—$Ga_2S_3$, $Li_2S$—$B_2S_3$, $Li_2S$—$P_2S_5$—X, $Li_2S$—$SiS_2$—X, $Li_2S$—$GeS_2$—X, $Li_2S$—$Ga_2S_3$—X, $Li_2S$—$B_2S_3$—X (X being one or more of LiI, $B_2S_3$ and $Al_2S_3$).

Further, in a case where the inorganic solid state electrolyte is an amorphous material (a glass), the inorganic solid state electrolyte may contain an oxygen-containing compound such as a lithium phosphate ($Li_3PO_4$), a lithium oxide ($Li_2O$), a phosphorus oxide ($P_2O_5$) and a lithium borate ($Li_3BO_3$), and a nitrogen-containing compound such as $Li_3PO_{4-z}N_{2x/3}$ (x being in the range of 0<x<4), $Li_4SiO_{4-x}N_{2x/3}$ (x being the range of 0<x<4), $Li_4GeO_{4-x}N_{2x/3}$ (x being in the range of 0<x<4) and $Li_3BO_{3-x}N_{2x/3}$ (x being in the range 0<x<3). Adding the oxygen-containing or nitrogen-containing compound expands void space in the resulting amorphous structure, thereby reducing drag on the movement of lithium ions, and further increasing ion conductivity.

As the lithium salt, a substance soluble in the non-aqueous electrolyte is used. Examples of such a substance include a salt containing one or more of the following: $LiCl$, $LiBr$, $LiI$, $LiClO_4$, $LiBF_4$, $LiB_{10}C_{10}$, $LiPF_6$, $LiCF_3SO_3$, $LiCF_3CO_2$, $LiAsF_6$, $LiSbF_6$, $LiB_{10}Cl_{10}$, $LiAlCl_4$, $CH_3SO_3L_1$, $CF_3SO_3Li$, $(CF_3SO_2)_2NLi$, a chloroborane lithium, a low-grade lithium aliphatic carbonate, a lithium 4-phenyl borate and an imide group.

For the purpose of improving discharging and charging characteristics and flame retardance, the following compounds can be added to the non-aqueous electrolyte: for example, a pyridine, a triethyl phosphate, a triethanolamine, a cyclic ether, an ethylenediamine, an n-glyme, a hexaphosphoric triamide, a nitrobenzene derivative, a sulfur, a quinonimine dye, an N-substituted oxazolidinone and an N,N-substituted imidazolidine, an ethylene glycol dialkyl ether, an ammonium salt, a polyethylene glycol, a pyrrole, a 2-methoxy ethanol, an aluminum trichloride, a conductive polymer, a monomer of an active material, a triethylene phosphoamide, a trialkyl phosphine, a morpholine, an aryl compound having a carbonyl group, a hexamethylphosphoric triamide and a 4-alkyl morpholine, a dicyclic tertiary amine, oil, a phosphonium salt and a tertiary sulfonium salt, a phosphazene, and a carbonate ester. In order to make the electrolyte solution nonflammable, a halogen solvent, such as a carbon tetrachloride and a trifluoroethylene, can be added to the electrolyte solution. In order to allow the electrolyte solution to have an adequacy in a high temperature environment, a carbon dioxide gas can be added to the electrolyte solution.

The lithium rechargeable battery according to the present invention is a rechargeable battery having a superior battery performance, in particular, a superior cyclic characteristic. The battery can be in the form of a button, a sheet, a cylinder, an angle, or a coin.

There is no particular restriction with regard to applications of the lithium rechargeable battery according to the present invention. Examples of applications include as powder sources or backup power sources for domestic appliances such as notebook personal computers, laptop personal computers, pocket word processors, portable telephones, cordless terminals, portable CD players, radios, LCD televisions, electric shavers, memory cards, electronic devices such as video players, automobiles, electric vehicles, and game players.

EMBODIMENTS

The present invention is further explained in detail in the following by using embodiments. The embodiments are merely for exemplification purposes, and the invention is not limited to these embodiments.

A magnesium compound having solid state properties shown in Table 1 was used. The average particle size was obtained by using a laser particle size distribution measurement method.

TABLE 1

| Specimen | Magnesium compound | Average particle size (μm) |
|---|---|---|
| 1-1 | $Mg_3(PO_4)_2 \cdot 8H_2O$ | 12.1 |
| 1-2 | $MgF_2$ | 6.0 |
| 1-3 | $MgCl_2$ | 6.0 |
| 2-1 | $MgO$ | 5.2 |
| 2-2 | $Mg(OH)_2$ | 28.2 |

(Note)
$Mg_3(PO_4)_2 \cdot 8H_2O$ was manufactured by Kishita Chemical Co., Ltd.;
$MgF_2$ was manufactured by Stellar Manufacturing Co.;
$MgCl_2$ was manufactured by Wako Pure Chemicals Industry;
MgO was manufactured by Tateho Chemical Industries Co., Ltd.; and
$Mg(OH)_2$ was manufactured by Kanto Chemical Co., Inc.

First Synthesis Example

First Magnesium Compound Added Specimen

Tricobalt tetroxide (having an average particle size of 2 μm) and lithium carbonate (having an average particle size of 7 μm) were weighed so as to have a molar ratio (Li/Co) of 1.030 between Li and Co. As the first magnesium compound, $MgF_2$ (having an average particle size of 6 μm) was further added so as to have an Mg content of 1.2 weight % in a resulting product. A uniform mixture of these raw materials was obtained by thoroughly performing a dry type mixing. The mixture was put in an alumina pot and sintered for 5 hours at 1050° C. in an air atmosphere. After sintering, the sintered product was collected by putting the pot upside down. The collected product was ground and classified, and a lithium transition metal composite oxide containing Mg atoms was obtained.

Lithium transition metal composite oxides containing Mg atoms were similarly obtained by adding $MgF_2$ so as to have Mg contents of 0.1 weight %, 0.2 weight %, 0.3 weight % and 0.7 weight %, respectively, in the resulting products.

Second Synthesis Example

Second Magnesium Compound Added Specimen

Tricobalt tetroxide (having an average particle size of 2 μm) and lithium carbonate (having an average particle size of 7 μm) were weighed so as to have a molar ratio (Li/Co) of 1.030 between Li and Co. As the second magnesium compound, $Mg(OH)_2$ (having an average particle size of 28.2 μm) was further added so as to have an Mg content of 1.2 weight % in a resulting product. A uniform mixture of these raw materials was obtained by thoroughly performing a dry type mixing. The mixture was put in an alumina pot and sintered for 5 hours at 1050° C. in an air atmosphere. After sintering, the sintered product was collected by putting the pot upside down. The collected product was ground and classified, and a lithium transition metal composite oxide containing Mg atoms was obtained.

Lithium transition metal composite oxides containing Mg atoms were similarly obtained by adding $Mg(OH)_2$ so as to have Mg contents of 0.1 weight %, 0.2 weight %, 0.3 weight %, 0.7 weight % and 1.2 weight %, respectively, in the resulting products.

(Distribution of Mg Atoms Inside and Outside Particles)

X-ray Photoelectron Spectroscopy (XPS) analyses were performed on particles of the lithium transition metal composite oxides obtained in the first and second synthesis examples having Mg content of 1.2 weight %. After argon etching of surfaces, Mg peaks were measured along a depthwise direction, and the results of the measurements are shown in FIG. 1A and FIG. 1B.

Conditions for the X-ray Photoelectron Spectroscopy analysis are as follows.

Etching rate: 7.7 nm/min (surface etching by Ar)

Figure 2:
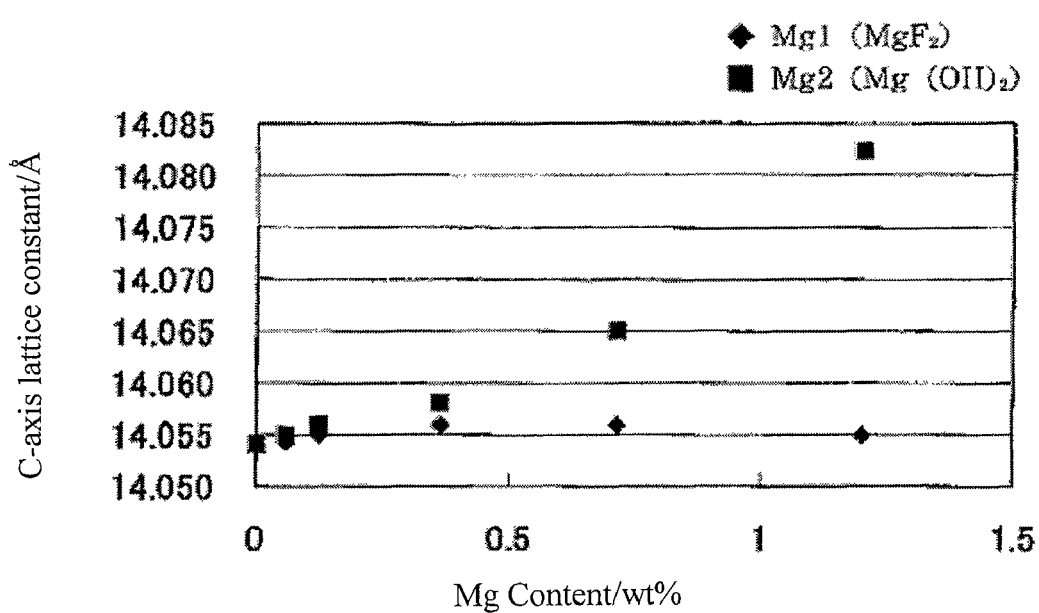
FIG. 2 illustrates a change of a lattice constant determined by XRD analysis of the lithium transition metal composite oxides according to the first synthesis example and the second synthesis example.

Etching time: 10 seconds×2 times; 20 seconds×2 times; 1 minutes×2 times; 2 minutes×2 times; and 3 minutes×2 times XRD analyses were performed to study changes in lattice constants of the lithium transition metal composite oxides obtained in the first and second synthesis examples having Mg contents of from 0.1 to 1.2 weight %, and the results of the analyses were shown in FIG. 2. Diffraction peaks of a magnesium oxide, in addition to those of a lithium transition metal composite oxide, were observed in an X-ray diffraction pattern of the lithium transition metal composite oxide obtained in the first synthesis example having Mg contents of 1.2 weight %, while no diffraction peaks of a magnesium oxide were observed in an X-ray diffraction pattern of the lithium transition metal composite oxide obtained in the second synthesis example having Mg contents of 1.2 weight %.

From the results shown in FIG. 1A and FIG. 1B, it is clear that, after sintering, the first magnesium compound preferentially distributes on surfaces of particles, and the second magnesium compound uniformly distributes inside the particles. From the results shown in FIG. 2, it is clear that, after sintering, the first magnesium compound does not cause changes in lattice constants of the resulting lithium transition metal composite oxide, while the second magnesium compound does cause changes in lattice constants of the resulting lithium transition metal composite oxide. From the fact that existence of magnesium oxides in the lithium transition metal composite oxide obtained by adding the first magnesium compound was confirmed, it is clear that the first magnesium compound preferentially exists as oxides of magnesium on surfaces of particles of the lithium transition metal composite oxide. On the other hand, it is clear that the second magnesium compound uniformly exists inside the particles of the lithium transition metal composite oxide in the form of a solid solution. Therefore, it is clear that the first magnesium compound and the second magnesium compound behave distinctly differently.

Embodiments 1-18

Tricobalt tetroxide (having an average particle size of 2 μm) and lithium carbonate (having an average particle size of 7 μm) were weighed so as to have molar ratios of Co atoms and Li atoms as shown in Table 2. First magnesium compound specimen and second magnesium compound specimen as shown in Table 2 were added so as to have molar ratios of Mg atoms as shown in Table 2, and the raw materials were thoroughly mixed by performing a dry type mixing. The mixture was then sintered in an alumina pot at a temperature for a time period as shown in Table 4 in an air atmosphere. After sintering, the sintered product was collected by putting the pot upside down. The collected product was ground and classified, and a lithium transition metal composite oxide containing Mg atoms was obtained.

After a specimen was collected, the interior of the pot was visually inspected, and the result was recorded in Table 4. Meanings of the symbols in Table 4 are as follows.

O: Nearly no attachment of product material on the bottom of the inner wall of the pot.

Δ: Attachment of product material observed at some spots on the bottom of the inner wall of the pot.

X: Attachment of product material observed on all over the bottom of the inner wall of the pot.

Comparative Examples 1-6

Tricobalt tetroxide (having an average particle size of 2 μm) and lithium carbonate (having an average particle size of 7 μm) were weighed so as to have molar ratios of Co atoms and Li atoms as shown in Table 3. Magnesium compound specimen as shown in Table 3 was added so as to have a molar ratio of Mg atoms as shown in Table 3, and the raw materials were thoroughly mixed by performing a dry type mixing. The mixture was then sintered in an alumina pot at a temperature for a time period as shown in Table 5 in an air atmosphere. The sintered product was collected by putting the pot upside down. The collected product was ground and classified, and a lithium transition metal composite oxide containing Mg atoms was obtained. A product prepared without adding a magnesium compound was used as Comparative Example 1.

Similar to Embodiments 1-18, after a specimen was collected, the interior of the pot was visually inspected, and the result was recorded in Table 5.

TABLE 2

| | Type of added Mg compound | | Raw material composition | | Additive amount of Mg raw material (wt %) | |
|---|---|---|---|---|---|---|
| | First Mg compound | Second Mg compound | Li atoms (molar ratio) | Co atoms (molar ratio) | 1-Mg atoms (wt %) | 2-Mg atoms (wt %) |
| Embodiment 1 | 1-1 | 2-1 | 1.030 | 1.000 | 0.006 | 0.006 |
| Embodiment 2 | 1-1 | 2-1 | 1.045 | 1.000 | 0.050 | 0.050 |
| Embodiment 3 | 1-1 | 2-1 | 1.010 | 1.000 | 0.450 | 0.450 |
| Embodiment 4 | 1-1 | 2-2 | 1.030 | 1.000 | 0.006 | 0.006 |
| Embodiment 5 | 1-1 | 2-2 | 1.045 | 1.000 | 0.050 | 0.050 |
| Embodiment 6 | 1-1 | 2-2 | 1.010 | 1.000 | 0.450 | 0.450 |
| Embodiment 7 | 1-2 | 2-1 | 1.030 | 1.000 | 0.006 | 0.006 |
| Embodiment 8 | 1-2 | 2-1 | 1.045 | 1.000 | 0.050 | 0.050 |
| Embodiment 9 | 1-2 | 2-1 | 1.010 | 1.000 | 0.450 | 0.450 |
| Embodiment 10 | 1-2 | 2-2 | 1.030 | 1.000 | 0.006 | 0.006 |
| Embodiment 11 | 1-2 | 2-2 | 1.045 | 1.000 | 0.050 | 0.050 |
| Embodiment 12 | 1-2 | 2-2 | 1.010 | 1.000 | 0.450 | 0.450 |
| Embodiment 13 | 1-3 | 2-1 | 1.030 | 1.000 | 0.006 | 0.006 |
| Embodiment 14 | 1-3 | 2-1 | 1.045 | 1.000 | 0.050 | 0.050 |
| Embodiment 15 | 1-3 | 2-1 | 1.010 | 1.000 | 0.450 | 0.450 |
| Embodiment 16 | 1-3 | 2-2 | 1.030 | 1.000 | 0.006 | 0.006 |
| Embodiment 17 | 1-3 | 2-2 | 1.045 | 1.000 | 0.050 | 0.050 |
| Embodiment 18 | 1-3 | 2-2 | 1.010 | 1.000 | 0.450 | 0.450 |

(Note)
In Table 2, "1-Mg atoms" means the additive amount of Mg atoms in the first magnesium compound, and "2-Mg atom" means the additive amount of Mg atoms in the second magnesium compound.

TABLE 3

| | Type of added Mg compound | | Raw material composition | | Additive amount of Mg raw material (wt %) | |
|---|---|---|---|---|---|---|
| | First Mg compound | Second Mg compound | Li atoms (molar ratio) | Co atoms (molar ratio) | 1-Mg atoms (wt %) | 2-Mg atoms (wt %) |
| Comparative example 1 | — | — | | 1.000 | — | — |
| Comparative example 2 | | 2-2 | 1.045 | 1.000 | — | 0.10 |
| Comparative example 3 | | 2-1 | 1.045 | 1.000 | — | 0.10 |
| Comparative example 4 | 1-3 | | 1.045 | 1.000 | 0.10 | — |
| Comparative example 5 | 1-2 | | 1.045 | 1.000 | 0.10 | — |
| Comparative example 6 | 1-1 | | 1.045 | 1.000 | 0.10 | — |

(Note)
In Table 3, "1-Mg atoms" means the additive amount of Mg atoms in the first magnesium compound, and "2-Mg atom" means the additive amount of Mg atoms in the second magnesium compound.

TABLE 4

| | Sintering temperature (° C.) | Sintering time (h) | Pot inner wall condition |
|---|---|---|---|
| Embodiment 1 | 1000 | 3 | ○ |
| Embodiment 2 | 1080 | 5 | ○ |
| Embodiment 3 | 1050 | 2 | ○ |
| Embodiment 4 | 1000 | 3 | ○ |
| Embodiment 5 | 1080 | 5 | ○ |
| Embodiment 6 | 1050 | 2 | ○ |
| Embodiment 7 | 1000 | 3 | ○ |
| Embodiment 8 | 1080 | 5 | ○ |

TABLE 4-continued

|  | Sintering temperature (° C.) | Sintering time (h) | Pot inner wall condition |
|---|---|---|---|
| Embodiment 9 | 1050 | 2 | ○ |
| Embodiment 10 | 1000 | 3 | ○ |
| Embodiment 11 | 1080 | 5 | ○ |
| Embodiment 12 | 1050 | 2 | ○ |
| Embodiment 13 | 1000 | 3 | ○ |
| Embodiment 14 | 1080 | 5 | ○ |
| Embodiment 15 | 1050 | 2 | ○ |
| Embodiment 16 | 1000 | 3 | ○ |
| Embodiment 17 | 1080 | 5 | ○ |
| Embodiment 18 | 1050 | 2 | ○ |

TABLE 5

|  | Sintering temperature (° C.) | Sintering time (h) | Pot inner wall condition |
|---|---|---|---|
| Comparative example 1 | 1020 | 6 | ○ |
| Comparative example 2 | 1000 | 3 | ○ |
| Comparative example 3 | 1080 | 5 | ○ |
| Comparative example 4 | 1050 | 2 | X |
| Comparative example 5 | 1080 | 5 | X |
| Comparative example 6 | 1080 | 5 | X |

From Table 4 and Table 5, it is clear that combining the first magnesium compound and the second magnesium compound results in no reaction between an anionic material and the sintering container, and a superior detachability from the container.

Embodiment 19 and Comparative Examples 7 and 8

Tricobalt tetroxide (having an average particle size of 2 μm), lithium carbonate (having an average particle size of 7 μm) and titanium oxide ($TiO_2$ having an average particle size of 0.4 μm) were weighed so as to have molar ratios of Co atoms, Li atoms and Ti atoms as shown in Table 6. Aluminum compound specimens as shown in Table 6 were added so as to have molar ratios of Al atoms as shown in Table 6, and the raw materials were thoroughly mixed by performing a dry type mixing. The mixture was then sintered in an alumina pot at a temperature for a time period as shown in Table 7 in an air atmosphere. The sintered product was collected by putting the pot upside down. The collected product was ground and classified, and a lithium transition metal composite oxide containing Al atoms was obtained.

Similar to Embodiments 1-18, after a specimen was collected, the interior of the pot was visually inspected, and the result was recorded in Table 7.

$Al(OH)_3$ has an average particle size of 1.3 μm and was manufactured by Showa Denko, K. K. (product name: H42M), and $AlF_3$ has an average particle size of 82 μm and was manufactured by Stella Chemifa Corporation.

TABLE 7

|  | Sintering temperature (° C.) | Sintering time (h) | Pot inner wall condition |
|---|---|---|---|
| Embodiment 19 | 1060 | 5 | ○ |
| Comparative example 7 | 1040 | 5 | ○ |
| Comparative example 8 | 1040 | 5 | X |

[Evaluation of Solid State Properties of Lithium Transition Metal Composite Oxides]

For the lithium transition metal composite oxides obtained in Embodiments 1-19 and Comparative Examples 1-8, Mg and Al contents, average particle sizes, BET ratio surface areas and free anion amounts were measured. Mg and Al contents and free anion amounts were measured by using the measuring methods described below.

(1) Mg and Al Contents

Mg and Al contents are the values obtained by dissolving a specimen using an acid and measuring the solution using ICP.

(2) Measurement of Free Anion Amount

A lithium transition metal composite oxide specimen of 30 g was dispersed in 100 ml purified water for 5 minutes at 25° C. Various anions eluted from surfaces of the particles. Anon amount of halogen ions such as fluorine ions and chlorine ions, phosphate ions and hydrogen phosphate ions in the solution was quantitatively measured by using ion chromatography, the result was shown in Tables 8-10.

In Embodiments 1-6 and Comparative Example 6, $(PO_4)^{2-}$ amount was measured; in Embodiment 17-12 and 19 and Comparative Examples 5, 7 and 8, $F^-$ amount was measured; and in Embodiments 13-18 and Comparative Example 4, $Cl^-$ amount was measured. In Comparative Examples 1-3; $(PO_4)^{2-}$ amount, F— amount and $Cl^-$ amount were measured and the total amount was shown.

TABLE 6

|  | First Al compound | Second Al compound | Li atoms (molar ratio) | Co atoms (molar ratio) | Ti atoms (molar ratio) | 1-Al atoms (wt %) | 2-Al atoms (wt %) |
|---|---|---|---|---|---|---|---|
| Embodiment 19 | $AlF_3$ | $Al(OH)_3$ | 1.070 | 0.995 | 0.005 | 0.08 | 0.33 |
| Comparative example 7 | — | $Al(OH)_3$ | 1.000 | 0.940 | 0.06 | — | 0.33 |
| Comparative example 8 | $AlF_3$ | — | 1.000 | 0.995 | 0.005 | 0.08 | — |

TABLE 8

|  | Mg content (weight %) | Average particle size (μm) | BET ratio surface area (m²/g) | Free anion amount (ppm) |
|---|---|---|---|---|
| Embodiment 1 | 0.012 | 9.5 | 0.33 | 15 |
| Embodiment 2 | 0.010 | 12.0 | 0.23 | 105 |
| Embodiment 3 | 0.9 | 6.2 | 0.42 | 320 |
| Embodiment 4 | 0.012 | 10.0 | 0.35 | 20 |
| Embodiment 5 | 0.10 | 14.1 | 0.21 | 120 |
| Embodiment 6 | 0.90 | 5.8 | 0.50 | 350 |
| Embodiment 7 | 0.012 | 11.0 | 0.32 | 151 |

TABLE 8-continued

| | Mg content (weight %) | Average particle size (μm) | BET ratio surface area (m²/g) | Free anion amount (ppm) |
|---|---|---|---|---|
| Embodiment 8 | 0.10 | 16.0 | 0.18 | 253 |
| Embodiment 9 | 0.9 | 7.2 | 0.41 | 1001 |
| Embodiment 10 | 0.012 | 10.8 | 0.28 | 220 |
| Embodiment 11 | 0.1 | 15.0 | 0.25 | 280 |
| Embodiment 12 | 0.9 | 8.1 | 0.41 | 880 |
| Embodiment 13 | 0.012 | 12.0 | 0.25 | 15 |
| Embodiment 14 | 0.10 | 14.1 | 0.30 | 30 |
| Embodiment 15 | 0.9 | 6.2 | 0.48 | 80 |
| Embodiment 16 | 0.012 | 11.0 | 0.21 | 18 |
| Embodiment 17 | 0.10 | 13.8 | 0.21 | 62 |
| Embodiment 18 | 0.9 | 12.1 | 0.18 | 120 |

TABLE 9

| | Mg content (weight %) | Average particle size (μm) | BET ratio surface area (m²/g) | Free anion amount (ppm) |
|---|---|---|---|---|
| Comparative example 1 | — | 12.1 | 0.28 | 3 |
| Comparative example 2 | 0.10 | 13.2 | 0.25 | 6 |
| Comparative example 3 | 0.10 | 18.2 | 0.32 | 12 |
| Comparative example 4 | 0.10 | 15.0 | 0.18 | 43 |
| Comparative example 5 | 0.10 | 19.2 | 0.38 | 150 |
| Comparative example 6 | 0.10 | 10.8 | 0.32 | 250 |

TABLE 10

| | Al content (weight %) | Average particle size (μm) | BET ratio surface area (m²/g) | Free anion amount (ppm) |
|---|---|---|---|---|
| Embodiment 19 | 0.41 | 12.0 | 0.26 | 420 |
| Comparative example 7 | 0.33 | 6.1 | 0.51 | 5 |
| Comparative example 8 | 0.08 | 8.2 | 0.39 | 430 |

[Battery Performance Test]
(1) Lithium Rechargeable Battery Fabrication
A cathode mix was obtained by mixing 91 weight % lithium transition metal composite oxide obtained in Embodiments 1-19 and Comparative Examples 1-8, 6 weight % graphite powder and 3 weight % polyvinylidene fluoride. The cathode mix was dispersed in N-methyl-2-pyrrolidinone to prepare a kneaded paste. The kneaded paste was painted on an aluminum foil. The aluminum foil was then dried and pressed, and a disk having a diameter of 15 mm was stamped out to obtained a cathode plate.

A lithium rechargeable battery was fabricated by using the cathode plate and other components such as a separator, an anode, a cathode, current collectors, mounting hardware, external terminals and an electrolyte. A metallic lithium foil was used as the anode. The electrolyte was prepared by solving one mole of $LiPF_6$ in 1 liter of an 1:1 kneaded solution of ethyl carbonate and methyl ethyl carbonate.

(2) Battery Performance Evaluation
The fabricated lithium rechargeable battery was operated in room temperature under the following conditions, and the following battery performance was evaluated.

[Cyclic Characteristic Evaluation]
The cathode was charged by using a constant current/constant voltage (CCCV) charging technique at 1.0 C for 5 hours until 4.4 V, and then, was discharged at a discharging rate of 0.2 C until 2.7 V. Service capacity was measured for each cycle of the charging and discharging operations. Twenty cycles of the charging-discharging operations were repeated. From the service capacity of the $1^{st}$ cycle and the service capacity of the $20^{th}$ cycle, a capacity maintenance ratio was calculated according to the following equation. The service capacity of the $1^{st}$ cycle was used as initial service capacity.

$$\text{Capacity maintenance ratio (\%)} = \frac{\text{Service capacity at the } 20^{th} \text{ cycle}}{\text{Service capacity at the } 1^{st} \text{ cycle}} \times 100 \qquad \text{Equation 1}$$

TABLE 11

| | Initial service capacity (mAh/g) | Capacity maintenance ratio (%) |
|---|---|---|
| Embodiment 1 | 173 | 97.1 |
| Embodiment 2 | 171 | 97.4 |
| Embodiment 3 | 160 | 97.2 |
| Embodiment 4 | 174 | 97.0 |
| Embodiment 5 | 171 | 97.5 |
| Embodiment 6 | 158 | 96.8 |
| Embodiment 7 | 173 | 96.8 |
| Embodiment 8 | 170 | 96.6 |
| Embodiment 9 | 159 | 96.5 |
| Embodiment 10 | 173 | 96.8 |
| Embodiment 11 | 169 | 97.2 |
| Embodiment 12 | 158 | 96.4 |
| Embodiment 13 | 174 | 98.2 |
| Embodiment 14 | 170 | 96.8 |
| Embodiment 15 | 157 | 96.5 |
| Embodiment 16 | 173 | 96.8 |
| Embodiment 17 | 170 | 96.6 |
| Embodiment 18 | 158 | 97.0 |

TABLE 12

| | Initial service capacity (mAh/g) | Capacity maintenance ratio (%) |
|---|---|---|
| Comparative example 1 | 170 | 93.0 |
| Comparative example 2 | 170 | 92.5 |
| Comparative example 3 | 169 | 91.8 |
| Comparative example 4 | 168 | 95.6 |
| Comparative example 5 | 169 | 96.0 |
| Comparative example 6 | 170 | 95.9 |

TABLE 13

| | Initial service capacity (mAh/g) | Capacity maintenance ratio (%) |
|---|---|---|
| Embodiment 19 | 172 | 97.1 |
| Comparative example 7 | 161 | 95.3 |
| Comparative example 8 | 169 | 91.5 |

As shown in Tables 4-13, good cyclic characteristics of greater than or equal to 96% and good pot conditions were maintained in Embodiments 1-19, while good cyclic characteristics were not obtained in Comparative Examples 1-3 and 7. Comparative Examples 4-6 and 8 showed good cyclic characteristics, but attachment to inner wall of the sintering container occurred, and products of stable quality were not obtained.

INDUSTRIAL APPLICABILITY

The cathode active material of the present invention does not cause a reaction between an anionic material and a sintering container, and prevents attachment of the cathode active material to a sintering container, thereby providing an industrial advantage in manufacturing and allowing in particular a superior cyclic characteristic for a lithium rechargeable battery using the cathode active material.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A cathode active material for a lithium rechargeable battery comprising a lithium transition metal composite oxide containing Mg or Al atoms,
   the lithium transition metal composite oxide is obtained from a mixture of a lithium compound, a transition metal compound and a metal compound,
   the metal compound containing Mg or Al atoms,
   the metal compound is obtained from a first metal compound and a second metal compound,
   wherein the first metal compound is selected from a halide, a phosphate, a hydrogen phosphate, and a sulfate of Mg or Al, and
   the second metal compound is selected from an oxide, a hydroxide, and a carbonate of Mg or Al,
   wherein Mg or Al atoms are contained in a lithium transition metal oxide, said lithium transition metal oxide being represented by one of the general formulas (1) to (4):

$Li_xCO_{1-y}Me_yO_2$, wherein Me is a transition metal element selected from Ga, and Zn, x being a number in a range of $0.9 \leq x \leq 1.2$, and y being a number in a range of $0 \leq y \leq 0.05$; (1)

$LiFePO_4$; (2)

$LiNi_{0.5}Mn_{1.5}O_4$; and (3)

$LiMn_2O_4$, (4)

and wherein the obtained lithium transition metal composite oxide containing Mg or Al atoms contains a metal oxide of MgO or $Al_2O_3$ present on or near the surface of a particle and Mg atoms or Al atoms forming a solid solution with the lithium transition metal composite oxide present inside the particle.

2. The cathode active material for a lithium rechargeable battery according to claim 1, wherein a content of Mg or Al is from 0.01 to 1.0 weight %.

3. The cathode active material for a lithium rechargeable battery according to claim 1, wherein an additive amount ($MC_2/MC_1$) of the second metal compound ($MC_2$) with respect to the first metal compound ($MC_1$) is from 20 to 500 weight %.

4. The cathode active material for a lithium rechargeable battery according to claim 1, wherein a content of free anions liquated out in water is less than or equal to 5000 ppm.

5. A lithium rechargeable battery comprising the cathode active material for a lithium rechargeable battery according to claim 1.

6. A method for manufacturing the cathode active material for a lithium rechargeable battery of claim 1, comprising:
   selecting a first metal compound from a group consisting of a halide, a phosphate, a hydrogen phosphate and a sulfate of Mg or Al;
   selecting a second metal compound of the metal from a group consisting of an oxide, a hydroxide and a carbonate of Mg or Al;
   combining the first metal compound and the second metal compound to obtain a third metal compound, the third metal compound containing Mg or Al atoms;
   mixing a lithium compound, a transition metal compound and the third metal compound to obtain a mixture; and
   sintering the mixture.

7. The method for manufacturing a cathode active material for a lithium rechargeable battery according claim 6, wherein an additive amount ($MC_2/MC_1$) of the second metal compound ($MC_2$) with respect to the first metal compound ($MC_1$) is from 20 to 500 weight %.

8. A cathode active material for a lithium rechargeable battery comprising a lithium transition metal composite oxide containing Mg or Al atoms,
   the lithium transition metal composite oxide is obtained from a mixture of a lithium compound, a transition metal compound and a metal compound,
   the metal compound containing Mg or Al atoms,
   the metal compound is obtained from a first metal compound and a second metal compound,
   wherein the first metal compound is selected from a halide, a phosphate, a hydrogen phosphate, and a sulfate of Mg or Al, and
   the second metal compound is selected from an oxide, a hydroxide, and a carbonate of Mg or Al,
   wherein Mg or Al atoms are contained in a lithium transition metal oxide, said lithium transition metal oxide being represented by general formula (5):

$LiNi_{1-x-y}Co_xMn_yO_2$, with $0 \leq x \leq 1.0$ and $0 \leq y \leq 1.0$; (5)

and wherein the obtained lithium transition metal composite oxide containing Mg or Al atoms contains a metal oxide of MgO or $Al_2O_3$ present on or near the surface of a particle and Mg atoms or Al atoms forming a solid solution with the lithium transition metal composite oxide present inside the particle.

9. The cathode active material for a lithium rechargeable battery according to claim 8, wherein a content of Mg or Al is from 0.01 to 1.0 weight %.

10. The cathode active material for a lithium rechargeable battery according to claim 8, wherein an additive amount ($MC_2/MC_1$) of the second metal compound ($MC_2$) with respect to the first metal compound ($MC_1$) is from 20 to 500 weight %.

11. The cathode active material for a lithium rechargeable battery according to claim 8, wherein a content of free anions liquated out in water is less than or equal to 5000 ppm.

12. A lithium rechargeable battery comprising the cathode active material for a lithium rechargeable battery according to claim 8.

* * * * *